(12) United States Patent
Jackson et al.

(10) Patent No.: US 6,908,288 B2
(45) Date of Patent: Jun. 21, 2005

(54) REPAIR OF ADVANCED GAS TURBINE BLADES

(75) Inventors: Melvin Robert Jackson, Niskayuna, NY (US); Aaron Todd Frost, Lewisville, TX (US); Shyh-Chin Huang, Latham, NY (US); Charles Gitahi Mukira, Clifton Park, NY (US); Thomas Robert Raber, Schenectady, NY (US); Raymond Alan White, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 231 days.

(21) Appl. No.: 09/682,899

(22) Filed: Oct. 31, 2001

(65) Prior Publication Data

US 2003/0082053 A1 May 1, 2003

(Under 37 CFR 1.47)

(51) Int. Cl.[7] ................................................. F01D 5/14
(52) U.S. Cl. .................... 416/224; 415/173.6; 415/200; 29/889.1; 428/680
(58) Field of Search ........................... 416/224, 241 R, 416/241 A; 29/889.1–889.21, 402.7–402.18, 899.1, 899.12, 899.21, 402.07; 415/173.6, 200; 428/680, 937; 148/428, 400–405; 420/444–445, 461–462

(56) References Cited

U.S. PATENT DOCUMENTS

| | | | | |
|---|---|---|---|---|
| 4,118,147 A | * | 10/1978 | Ellis | 416/230 |
| 4,364,160 A | * | 12/1982 | Eiswerth et al. | 29/889.721 |
| 4,390,320 A | * | 6/1983 | Eiswerth | |
| 4,411,597 A | * | 10/1983 | Koffel et al. | 416/92 |
| 5,348,446 A | * | 9/1994 | Lee et al. | |
| 5,351,395 A | * | 10/1994 | Crawmer et al. | 29/889.7 |
| 5,584,663 A | * | 12/1996 | Schell et al. | 416/241 R |
| 5,673,745 A | * | 10/1997 | Jackson et al. | 164/80 |
| 5,676,191 A | * | 10/1997 | Bewlay et al. | 164/80 |
| 5,735,044 A | * | 4/1998 | Ferrigno et al. | 29/889.1 |
| 5,738,491 A | * | 4/1998 | Lee et al. | 415/177 |
| 5,778,960 A | * | 7/1998 | Jackson et al. | 164/98 |
| 5,794,338 A | * | 8/1998 | Bowden et al. | 29/889.1 |
| 5,822,852 A | * | 10/1998 | Bewlay et al. | |
| 5,846,057 A | * | 12/1998 | Ferrigno et al. | 416/221 R |
| 5,904,201 A | * | 5/1999 | Jackson et al. | 164/80 |
| 6,036,791 A | * | 3/2000 | Mitsuhashi et al. | 148/404 |
| 6,042,880 A | * | 3/2000 | Rigney et al. | 427/142 |
| 6,049,978 A | * | 4/2000 | Arnold | |

(Continued)

OTHER PUBLICATIONS

Rh–Base Refractory Superalloys for Ultra–High Temperature Use, Y. Yamabe–Mitarai, Y. Koizumi, H. Murakami, Y. Ro, T. Maruko and H. Harada, Scripta Materialia, vol. 36, No. 4, pp. 393–398, 1997.

Ir–Base Refractory Superalloys for Ultra–High Temperatures, Y. Yamabe–Mitarai, Y. Ro, T. Maruko, and H. Harada, Metallurgical and MAterials Transactions A, vol. 29A, Feb. 1998, pp. 537–549.

*Primary Examiner*—Edward K. Look
*Assistant Examiner*—James M. McAleenan
(74) *Attorney, Agent, or Firm*—Paul J. DiConza; William E. Powell, III

(57) ABSTRACT

Methods for repairing and manufacturing a gas turbine blade, and the gas turbine blade repaired and manufactured with such methods are presented with, for example, the repair method comprising providing a gas turbine blade, the blade comprising a blade tip and a blade body; removing at least one portion of the blade tip; providing at least one freestanding tip insert; and disposing the at least one tip insert onto the gas turbine blade body such that the at least one tip insert replaces the at least one removed portion of the blade tip.

61 Claims, 4 Drawing Sheets

U.S. PATENT DOCUMENTS

| | | |
|---|---|---|
| 6,071,470 A | 6/2000 | Koizumi et al. |
| 6,238,187 B1 * | 5/2001 | Dulaney et al. ........ 416/241 R |
| 6,299,971 B1 * | 10/2001 | Maloney .................. 428/312.8 |
| 6,332,272 B1 * | 12/2001 | Sinnott et al. ............. 29/889.1 |
| 6,375,425 B1 * | 4/2002 | Lee et al. ................. 416/97 R |
| 6,413,051 B1 * | 7/2002 | Chou et al. |
| 6,423,935 B1 * | 7/2002 | Hackel et al. ......... 219/121.85 |
| 6,461,108 B1 * | 10/2002 | Lee et al. .................. 416/96 R |
| 6,468,040 B1 * | 10/2002 | Grylls et al. ................. 416/224 |
| 6,491,208 B2 * | 12/2002 | James et al. ................. 228/119 |

\* cited by examiner

REPAIR OF ADVANCED GAS TURBINE BLADES

BACKGROUND OF INVENTION

The present invention relates to components designed to operate at high temperatures. More particularly, this invention relates to methods for repair and manufacture of blades for gas turbine engines, and the articles made and repaired from the use of these methods.

In a gas turbine engine, compressed air is mixed with fuel in a combustor and ignited, generating a flow of hot combustion gases through one or more turbine stages that extract energy from the gas, producing output power. Each turbine stage includes a stator nozzle having vanes which direct the combustion gases against a corresponding row of turbine blades extending radially outwardly from a blade root, where a dovetail joint attaches the blade to a supporting rotor disk, to a blade tip at the opposite end. The blades are subject to substantial heat load, and, because the efficiency of a gas turbine engine is proportional to gas temperature, the continuous demand for efficiency improvements translates to a demand for blades that are capable of withstanding higher temperatures for longer service times.

Gas turbine blades are usually made of superalloys and are often cooled by means of internal cooling chambers and the addition of coatings, including thermal barrier coatings (TBC's) and environmentally resistant coatings, to their external surfaces. The term "superalloy" is usually intended to embrace iron-, cobalt-, or nickel-based alloys, which include one or more other elements including such non-limiting examples as aluminum, tungsten, molybdenum, titanium, and iron. The internal air cooling of turbine blades is often accomplished via a complex cooling scheme in which cooling air flows through channels within the blade ("internal cooling channels") and is then discharged through a configuration of cooling holes at the blade surface. Convection cooling occurs within the blade from heat transfer to the cooling air as it flows through the internal air cooling channels. In more complex configurations, fine internal orifices are often provided to direct cooling air flow directly against inner surfaces of the blade to achieve what is referred to as impingement cooling, while film cooling is often accomplished at the blade surface by configuring the cooling holes to discharge the cooling air flow across the blade surface so that the surface is protected from direct contact with the surrounding hot gases within the engine. TBC's comprise at least a layer of thermally insulating ceramic and often include one or more layers of metal-based, oxidation-resistant materials ("environmentally resistant coatings") underlying the insulating ceramic for enhanced protection of the blade. Environmentally resistant coatings are also frequently used without a TBC topcoat. Technologies such as coatings and internal cooling have effectively enhanced the performance of turbine blades, but material degradation problems persist in turbine blades due to locally aggressive conditions in areas such as blade tips.

A considerable amount of cooling air is often required to sufficiently lower the surface temperature of a blade. However, the casting process and the cores required to form the cooling channels limit the complexity of the cooling scheme that can be formed within a blade at the blade tip. The resulting restrictions in cooling airflow often promote higher local temperatures in this area relative to those existing in other locations on a given blade. In typical jet engines, for example, bulk average blade temperatures range between about 900° C. to about 1000° C., while blade tip surfaces often reach bout 1100° C. or more. Maximum surface temperatures are expected in future applications to be over about 1300° C. Of particular concern is the combination of stress with temperature, because metals, including alloys used to make gas turbine blades, tend to become weaker, or more easily deformed, as temperatures increase. Thus, while stress of a certain level operating on a cooler section of a blade may have little effect on performance, the same stress level may be beyond the performance capability of the material at hotter locations as described above. At such elevated temperatures, materials are more susceptible to damage due to a number of phenomena, including diffusion-controlled deformation ("creep"), cyclic loading and unloading ("fatigue"), chemical attack by the hot gas flow ("oxidation"), wear from rubbing contact between blade tips and turbine shrouds, wear from the impact of particles entrained in the gas flow ("erosion"), and others.

Damage to blades, particularly at blade tips, leads to degradation of turbine efficiency. As blade tips are deformed, oxidized, or worn away, gaps between the blade tip and the turbine shroud become excessively wide, allowing gas to leak through the turbine stages without the flow of the gas being converted into mechanical energy. When efficiency drops below specified levels, the turbine must be removed from service for overhaul and refurbishment. A significant portion of this refurbishment process is directed at the repair of blade tips.

In current practice, the original blade tip material is made of the same material as the rest of the original blade, often a superalloy based on nickel or cobalt. Because this material was selected to balance the design requirements of the entire blade, it is generally not optimized to meet the special local requirements demanded by conditions at the blade tip. The performance of alloys commonly used for repair is comparable or inferior to that of the material of the original component, depending upon the microstructure, defect density, and chemistry of the repair material. For example, many turbine blades are made using alloys that have been directionally solidified. The directional solidification process manipulates the orientation of metal crystals, or grains, as the alloy is solidified from the molten state, aligning the grains in one selected primary direction. The resultant alloy has enhanced resistance to creep and fatigue during service when compared to conventionally processed materials. Advanced applications employ alloys made of a single crystal for even further improvements in high-temperature creep and fatigue behavior. However, when blade tips are repaired by some conventional processes, using build-up of weld filler material, the resulting microstructure of the repair is typical of welded material, not directionally solidified or single-crystalline. Other repair methods, such as applying powder mixtures wherein one powder melts and densifies the repaired area during heat treatment, results in microstructures that differ from that of the parent alloy. Such microstructures, present in a conventional blade material such as a superalloy, may cause the blade to require excessively frequent repairs in advanced designs that rely on the benefits of directional solidification or single crystal processing to maintain performance.

Materials are characterized by several properties to aid in determining their suitability for use in demanding applications such as gas turbine blades. "Melting temperature" is used herein to refer to the temperature at which liquid metal begins to form as the material is heated. The term "creep life" is used in the art to refer to the length of time until a standard specimen of material extends to a preset length or fractures when subjected to a given stress level at a given temperature. Similarly, the term "fatigue life" is used in the art to describe the length of time until a standard specimen fractures when subjected to a given set of fatigue parameters, including minimum and maximum stress levels, frequency of loading/unloading cycle, and others, at a given temperature. The term "oxidation resistance" is used in the art to refer to the amount of damage sustained by a material when exposed to oxidizing environments, such as, for example, high temperature gases containing oxygen. Oxidation resistance is generally measured as the rate at which the weight of a specimen changes per unit surface area during exposure at a given temperature. In many cases, the weight change is measured to be a net loss in weight, as metal is converted to oxide that later detaches and falls away from the surface. In other cases, a specimen may gain weight if the oxide tends to adhere to the specimen, or if the oxide forms within the specimen, underneath the surface, a condition called "internal oxidation." A material is said to have "higher" or "greater" oxidation resistance than another if the material's rate of weight change per unit surface area is closer to zero than that of the other material for exposure to the same environment and temperature. Numerically, oxidation resistance can be represented by the time over which an oxidation test was run divided by the absolute value of the weight change per unit area.

Materials particularly noted for high creep life include oxide dispersion strengthened (ODS) materials and directionally solidified eutectic (DSE) alloys. Several materials from these classes have creep lives about three times those measured for conventional superalloys. ODS materials use mechanical techniques during processing to evenly distribute hard oxide particles of sizes less than about 0.1 micron within a metallic matrix, with the particles serving to make deformation of the material more difficult. DSE alloys are characterized by carefully controlled chemistry and processing, which produce a unique microstructure comprising the inherent fibrous or, in some cases, lamellar structure of the eutectic phase, with the fibers or lamellae aligned along a desired axis of the cast part in a manner analogous to a fiber-reinforced composite. DSE materials are also notable for excellent fatigue life, with certain alloys having about three times the fatigue lives measured for conventional superalloys. The careful processing controls needed to produce ODS and DSE alloys cause these materials to be prohibitively expensive.

The so-called "platinum group" of metal elements comprises rhodium (Rh), osmium (Os), platinum (Pt), iridium (Ir), ruthenium (Ru), palladium (Pd), and rhenium (Re) elements noted for high chemical resistance and very high melting temperatures in comparison to conventional superalloys. Several elements from this group are noteworthy as examples of materials with substantially higher oxidation resistance relative to current blade materials. Some platinum group metals and several alloys based on platinum group metals possess excellent resistance to oxidation at temperatures exceeding the capabilities of many Ni-based superalloys. The class of materials referred to as "refractory superalloys" offer additional strength over the platinum group metals, though at the expense of some oxidation resistance. These alloys are based on Ir or Rh, with transition metal additions of up to about 20 atomic percent, and are strengthened by a precipitate phase of generic formula $M_3X$, where M is Rh or Ir and X is typically Ti, V, Ta, or Zr, or combinations thereof. Some alloys of this type can withstand 1–2 hour exposures to at least about 1600° C. without catastrophic oxidation. Creep life and fatigue life data for these alloys are not readily available currently, but the high strength of these alloys suggests they are superior to some degree over conventional superalloys in both creep life and fatigue life at the temperatures and stress levels relevant to gas turbine blade components, although not to the same degree as the best ODS and DSE alloys.

Platinum group metals also have been incorporated into conventional superalloy compositions to produce a class of alloys, herein referred to as "platinum-group metal modified superalloys", having enhanced oxidation resistance and comparable mechanical properties to conventional superalloys. Typical alloys of this class comprise a conventional superalloy composition to which is added up to about 7 atomic percent of a platinum group metal, such as Ir, Rh, Pt, Pd, and Ru. Use of materials incorporating platinum-group metals has been limited to date due to the high density and very high cost of these materials in comparison to more conventional blade materials.

SUMMARY OF INVENTION

The selection of a particular alloy for use in a given turbine blade design is accomplished based on the critical design requirements for a number of material properties, including strength, toughness, environmental resistance, weight, cost, and others. When one alloy is used to construct the entire blade, compromises must be made in the performance of the blade because no single alloy possesses ideal values for the long list of properties required for the application, and because conditions of temperature, stress, impingement of foreign matter, and other factors are not uniform over the entire blade surface.

It would be advantageous if the performance of both newly manufactured and repaired blades could be improved to better withstand the localized aggressive stress-temperature combinations present at blade tips. However, it would not be desirable if improvements to such properties as creep life, fatigue life, and oxidation resistance were effected at the expense of other design critical requirements of the turbine blade. For example, a blade made entirely of platinum would have excellent oxidation resistance, but would lack needed strength and would cost many times the price of a blade made of conventional superalloy material. Therefore, it would be beneficial if turbine blades could be improved in a manner that would allow for enhanced blade tip performance without significantly detracting from the overall performance of the turbine blade. Furthermore, it would be advantageous if methods of turbine blade repair and manufacture could be developed that would overcome the limitations of typical weld repair and powder deposition methods described above by allowing for new blade tips to comprise material with properties equal to, and often greater than, those of the original blade.

The present invention provides several embodiments that address this need for blades with improved performance. One embodiment provides a method for repair of a gas turbine blade, the method comprising providing a gas turbine blade, the blade comprising a blade tip and a blade body; removing at least one portion of the blade tip; providing at least one freestanding tip insert; and disposing the at least one tip insert onto the gas turbine blade body to form a new blade tip. A second embodiment provides a method for manufacturing a gas turbine blade, the method comprising providing a gas turbine blade body, providing at least one freestanding tip insert, and disposing the at least one tip insert onto the gas turbine blade body such that a blade tip of the turbine blade comprises the at least one tip insert. A third embodiment provides a freestanding tip insert for manufacture and repair of a tip of a gas turbine blade, the tip insert comprising an external surface that substantially conforms with specified nominal dimensions for an external surface of the blade. A fourth embodiment provides a gas turbine blade comprising a turbine blade body and a blade tip, wherein the blade tip comprises at least one freestanding tip insert affixed to the blade body.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Structure, manufacture, and repair embodiments of the present invention are useful for components that operate at elevated temperatures, and particularly turbine blades (also referred to as "buckets") for gas turbine engines wherein the maximum metal temperatures typically range from about 1000° C. to over about 1200° C. in current systems and temperatures over about 1300° C. are envisioned for future applications.

Figure 1:
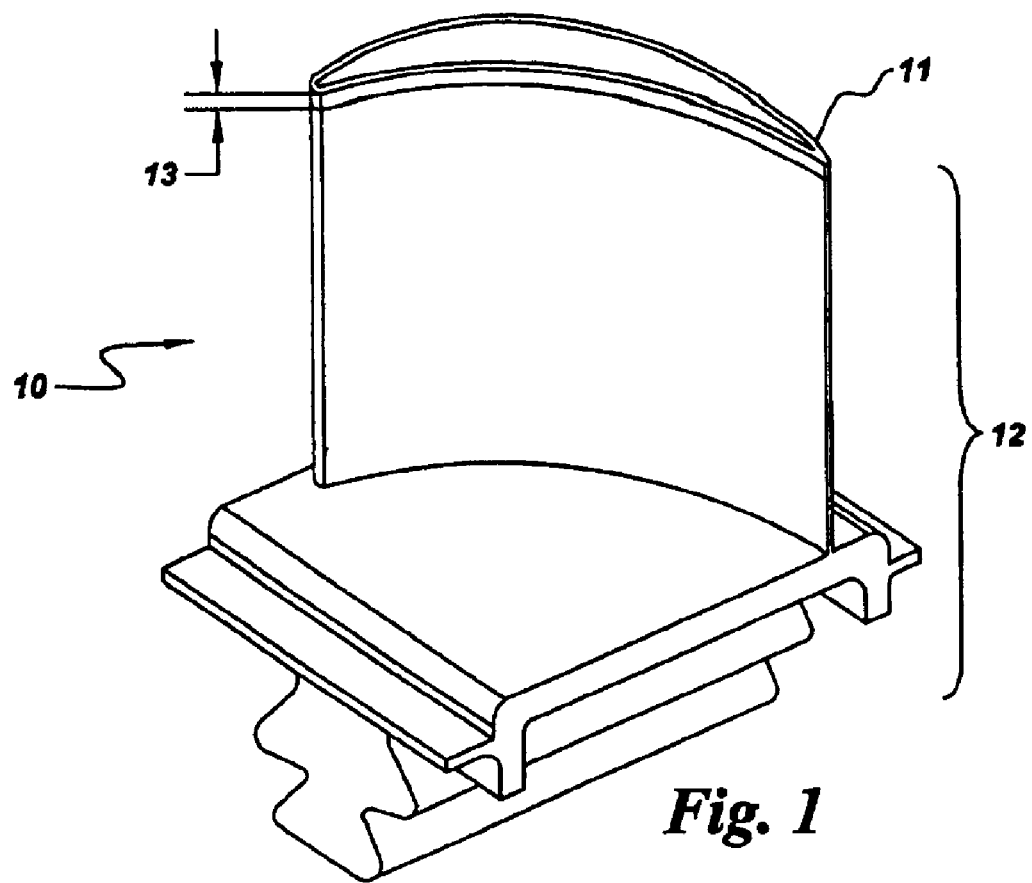
FIG. 1 is a perspective view of a gas turbine blade equipped with a blade tip in accordance with embodiments of the present invention.
Figure 2:
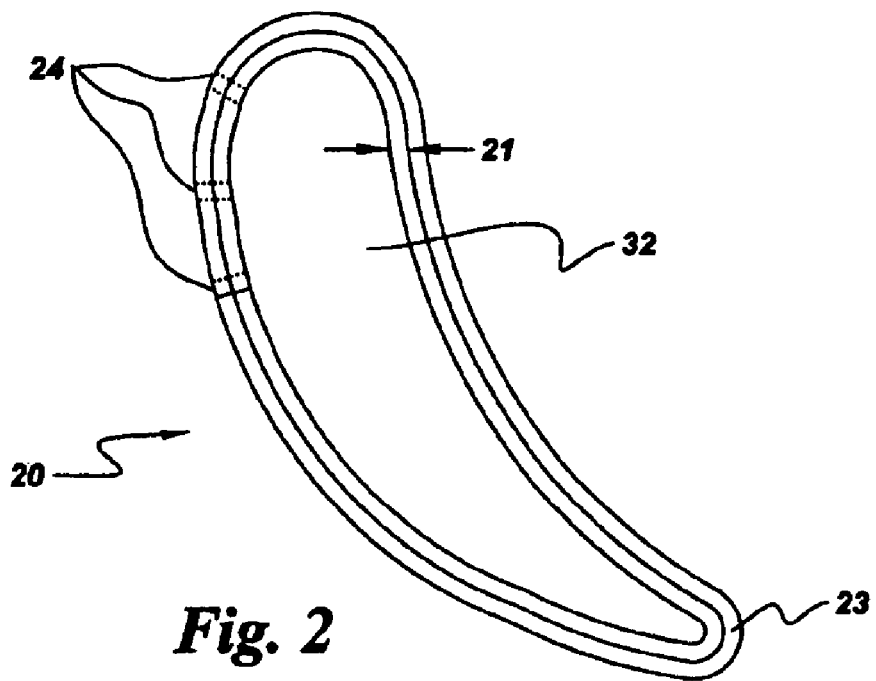
FIG. 2 is a cross-sectional view of a freestanding tip insert suitable for use as the blade tip of FIG. 1.
Figure 3:
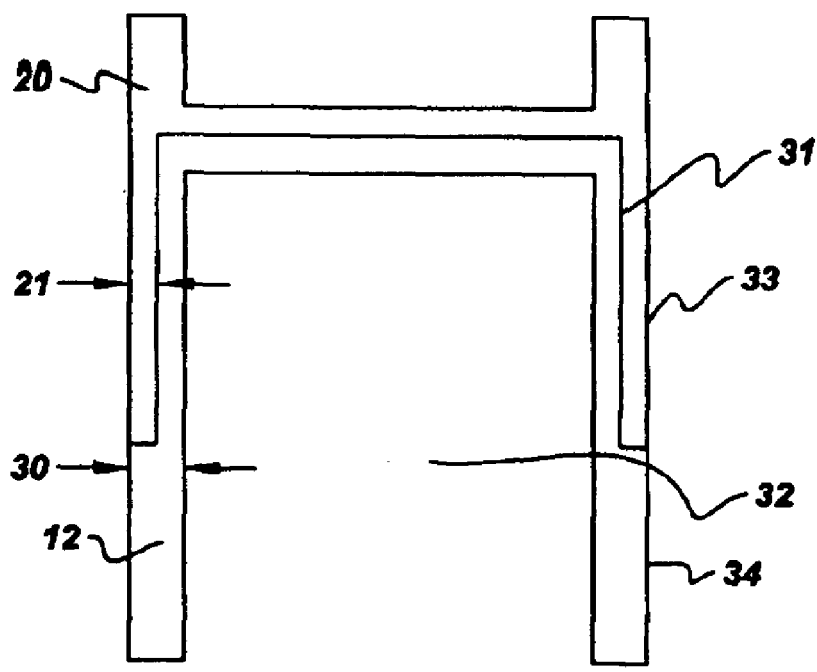
FIG. 3 is a cross-sectional view of one possible configuration for the joint between the blade tip and the blade body in accordance with embodiments of the present invention.
Figure 4:
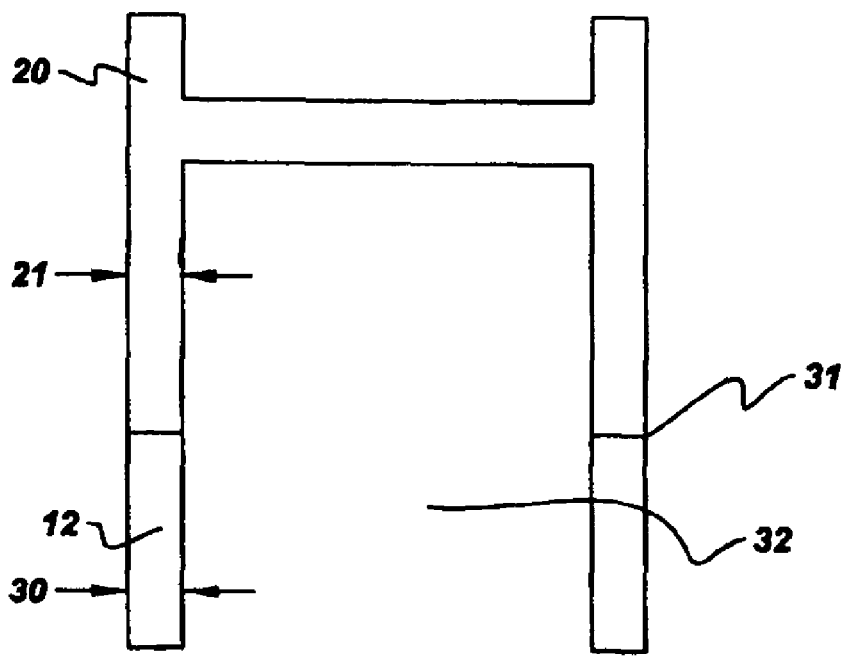
FIG. 4 is a cross-sectional view of another possible configuration for the joint of FIG. 3.
Figure 5:
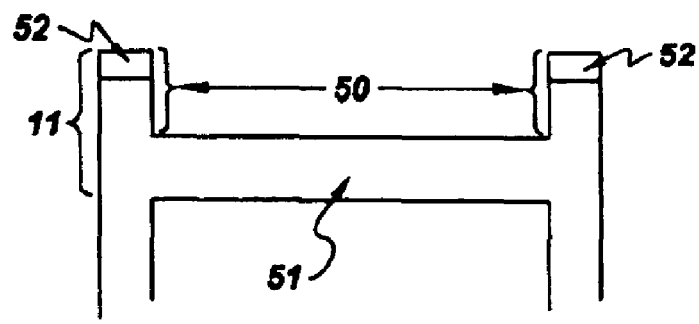
FIG. 5 is a cross-sectional view of an example of an airfoil tip with squealers.

Referring to FIGS. 1 and 2, one embodiment of the invention provides a method for repair of a gas turbine blade 10, the method comprising: providing a gas turbine blade 10, the blade comprising a blade tip 11 and a blade body 12; removing at least one portion of the blade tip 11; providing at least one freestanding tip insert 20 (FIG. 2); and disposing the at least one tip insert 20 onto the gas turbine blade body 12 such that the at least one tip insert 20 replaces the at least one portion of the blade tip 11. The term "tip insert" used herein refers to a freestanding article suitable in size, shape, and material properties to be used as a blade tip 11 or a portion of a blade tip 11 upon being disposed onto a blade body 12. The term "replaces" used herein means the tip insert 20 occupies the position on the blade 10 formerly occupied by the at least one removed portion. The height 13 of the blade tip 11 is in the range from about 3 mm to about 4 mm for blades used in aircraft engines, and from about 4 mm to about 11 mm for blades used in land-based power generation turbines. Several possible configurations exist for the joint between the at least one tip insert 20 and the blade body 12 (FIG. 1), two of which are illustrated in FIGS. 3 and 4. Those skilled in the art will appreciate from FIG. 3 that in certain embodiments the cross sectional thickness 21 of the at least one tip insert 20 is less than the wall thickness 30 of the blade body 12, while in other embodiments, as depicted in FIG. 4, for example, the cross sectional thickness 21 of the at least one tip insert 20 is at least equal to the wall thickness of 30 of the blade body 12. In particular embodiments, a non-limiting example of which is shown in FIG. 5, the blade tip 11 comprises at least one "squealer" 50 (a protrusion of material from the tip cap 51), and the at least one portion 52 of said blade tip 11 removed and replaced in the method of the present invention comprises said at least one squealer 50. Squealers 50 are employed to enhance the seal between the rotating turbine blade 10 and the adjacent stator (not shown), and because they are often subject to rubbing against the shroud during operation, squealers 50 undergo heating from both the hot gas stream and frictional heating from rubbing contact. Therefore, a squealer 50 is likely to be a section of the blade tip 11 highly prone to damage and highly likely to need replacement in accordance with the present invention. The embodiment depicted in FIG. 5 shows a blade tip 11 with two squealers 50, each of which having a portion 52 that has been removed and then replaced in accordance with the present invention.

In certain embodiments, the disposing step comprises joining the at least one tip insert 20 to the blade 10 by means of a process selected from the group consisting of welding, brazing, and diffusion bonding. The joint line 31 between the at least one tip insert 20 and the blade body 12 is advantageously located in a position sufficiently close to a cooling channel 32 so that the properties of the material along the joint line 31 are adequate to perform under the stress temperature combinations everywhere along the joint line 31. Alternatively, the height 13 (FIG. 1) of the at least one tip insert is sufficiently large to place the joint line 31 in a region on the blade 10 where the stress-temperature combination is able to be accommodated by the material along the joint line 31.

The dimensions of the blade 10 (FIG. 1) depend upon the particular blade design under consideration. Typically, design parameters such as, for example, the blade tip height 13 and the shape of an airfoil external surface 34 (FIG. 3), have preferred, or "nominal" values and tolerance ranges documented in technical specifications for the purposes of quality control. Thus it is commonly accepted in the art to refer to, for example, "specified nominal dimensions" for an external surface 34 of an airfoil, which in this example would signify the nominal shape documented for the airfoil external surface 34 in the pertinent technical specification.

In some cases, special consideration regarding the selection of the joining process is required, especially where large differences in melting point exist between material comprising the blade body 12 and the material comprising the at least one tip insert 20. For example, where the blade body material comprises a Ni-based superalloy with an exemplary melting temperature range from about 1300° C. to about 1350° C. and the tip insert material comprises a large amount of a platinum-group metal, with a melting temperature of at least about 1500° C., the employment of a joining process that generates low heat input into the blade body is useful to avoid overheating the blade body material. For example, brazing techniques and diffusion bonding processes are less likely to overheat the turbine blade than welding processes.

Diffusion bonding comprises bringing the components to be joined into intimate contact and heating them to a sufficiently high temperature such that solid-state diffusion occurs at the interface between the two components, forming a continuous solid bond. Fixtures (not shown) are used to ensure intimate contact is maintained throughout the procedure. In one embodiment of the present invention, the temperature is at least about 1200° C. so that a suitable bond can be achieved in about 4 hours.

In certain embodiments, after the at least one tip insert 20 has been disposed onto the blade body, further process steps are used to ensure the repaired blade meets design requirements for proper operation. Examples of such requirements include, but are not limited to, surface finish specifications, dimensional requirements, and bond strength requirements for the bond joining the tip insert material to the blade body 12. In one embodiment, a step of heat treating the repaired blade 10 is used to improve the bonding between the at least one tip insert 20 and the blade body 12, to relieve stresses accumulated by the repair process, and to improve the metallurgical condition of the overall part in terms of its grain size and precipitate phase distribution. Such a heat treatment step is typically done in vacuum or in an inert gas to avoid oxidizing the part, and is carried out using the process specified for the particular alloy comprising the blade body material to ensure the alloy's metallurgical properties are within the range specified for the turbine blade when processing is completed. In other embodiments, the step of disposing the at least one tip insert 20 comprises one or more machining operations, including grinding, milling, or other such processes, to restore the blade 10 to specified final dimensions and surface finish requirements. In certain embodiments this machining step includes a process such as grinding to provide a surface finish for the repaired turbine blade that meets the pertinent specification limit. Particular embodiments have a coating 23 (FIG. 2) applied to the turbine blade to afford even further high-temperature protection. This coating 23 typically comprises at least one layer, and optionally, in the case where a combination of a ceramic thermal barrier coating and an environmentally resistant coating is employed, a plurality of layers.

The tip insert 20 used in certain embodiments of this invention further comprises at least one internal cooling channel 32, and in particular embodiments the tip insert further comprises a plurality of cooling holes 24 (FIG. 2). The cooling holes 24 are created using any one of a number of techniques, including, for example, laser drilling, electric discharge machining, and electron beam drilling. These features add to the ability of the finished blade to perform under demanding thermal conditions.

In specific embodiments, the at least one tip insert 20 comprises a superalloy based on (i.e., the single largest elemental component by weight) a metal selected from the group consisting of cobalt, iron, and nickel. The at least one tip insert comprises a directionally solidified material in particular embodiments, and in selected embodiments the at least one tip insert comprises a single crystal material. The directionally solidified and single crystal embodiments are provided to enhance the high temperature performance of the blade tip during service.

The blade tip 11 often reaches temperatures over about 200° C. higher than the average temperature of the blade 10. Because of the particularly aggressive combination of stress and temperature present at blade tips, primary performance characteristics required for materials in these sections include creep life, fatigue life, oxidation resistance, and melting temperature, for example. The temperature range of interest in references to creep life, fatigue life, and oxidation resistance herein includes the range of from about 900° C. to about 1200° C., and relative statements made herein comparing creep rupture lives, fatigue lives, oxidation resistances, and melting temperatures of various materials assume equivalent levels of stress, temperature, and other critical factors for each material being compared.

In certain embodiments, the blade 10 comprises a first material and the at least one tip insert 20 comprises a second material, and each of a creep life, a fatigue life, and an oxidation resistance for the first material is essentially equivalent to each of a creep life, a fatigue life, and an oxidation resistance of the second material, respectively. The term "essentially equivalent" used herein means within the interval from about 20% below the value for the first material to about 20% above the value for the first material. Having these properties for the first and second materials be essentially equivalent in a repair method represents an improvement over conventional repair methods described above, in that the original performance levels for the blade are restored.

In particular embodiments, the blade comprises a first material and the tip insert comprises a second material, and at least one material property for the second material exceeds a corresponding material property for the first material, the at least one material property selected from the group consisting of oxidation resistance, creep life, and fatigue life. The term "exceeds" as used herein means that the pertinent material property for the second material has a value that is at least about 120% of the value of the corresponding property of the first material. Specific embodiments of this type include cases where the second material comprises a platinum group metal modified nickel-based superalloy. These embodiments include particular cases where the platinum group metal modified nickel-based superalloy comprises a metal selected from the group consisting of Pt, Pd, Rh, Ir, and Ru. A non-limiting example of an alloy of this type suitable for use in embodiments of the present invention comprises the following nominal composition (in weight percent): about 5.1% aluminum, about 8.0% chromium, about 11.4% tungsten, about 1.7% titanium, about 1.5% niobium, about 9.5% cobalt, about 0.09% carbon, about 0.02% boron, about 0.07% zirconium, about 9.9% platinum, and the balance nickel.

Other embodiments are provided by the present invention in which the second material has an oxidation resistance at least about three times greater (i.e., a measured weight change rate that is at most 33% of that measured for the first material under the same conditions) than an oxidation resistance of the first material. Materials selected from the group consisting of rhodium (Rh), platinum (Pt), palladium (Pd), and mixtures thereof show sufficient oxidation resistance for use as the second material in these embodiments. In particular embodiments of the present invention, the second material comprises Rh at a level of at least about 65 atomic percent.

Figure 6:
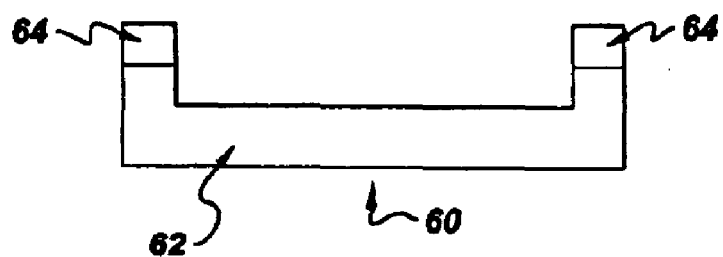
FIG. 6 is a cross-sectional view of an example of a tip insert.
Figure 7:
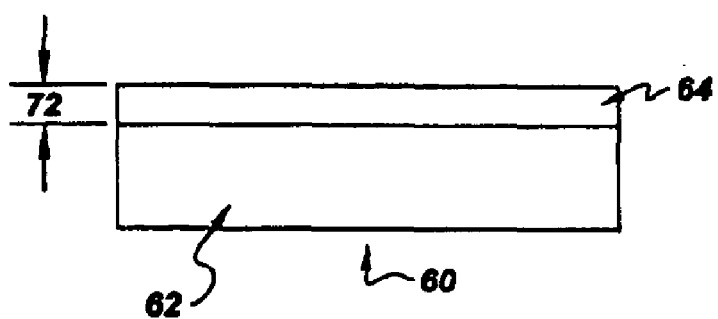
FIG. 7 is a cross-sectional view of another example of a tip insert.

In selected embodiments, non-limiting examples of which are shown in FIGS. 6 and 7, the at least one tip insert 60 further comprises a substrate material 62, and the second material 64 is disposed on the substrate material 62. In particular embodiments, the second material 64 comprises a layer with a cross-sectional thickness 72 (FIG. 7) in the range from about 0.13 mm to about 0.64 mm. The substrate material 62 comprises a material with strength properties, such as, for example, creep life and fatigue life, that are higher than those of the second material 64. These embodiments are provided for applications where the stress level present at the blade tip during service is too high to be fully supported by the platinum group metals listed above. The second material 64 provides superior oxidation resistance while allowing the stronger substrate material 62 to take up most of the load.

Figure 8:
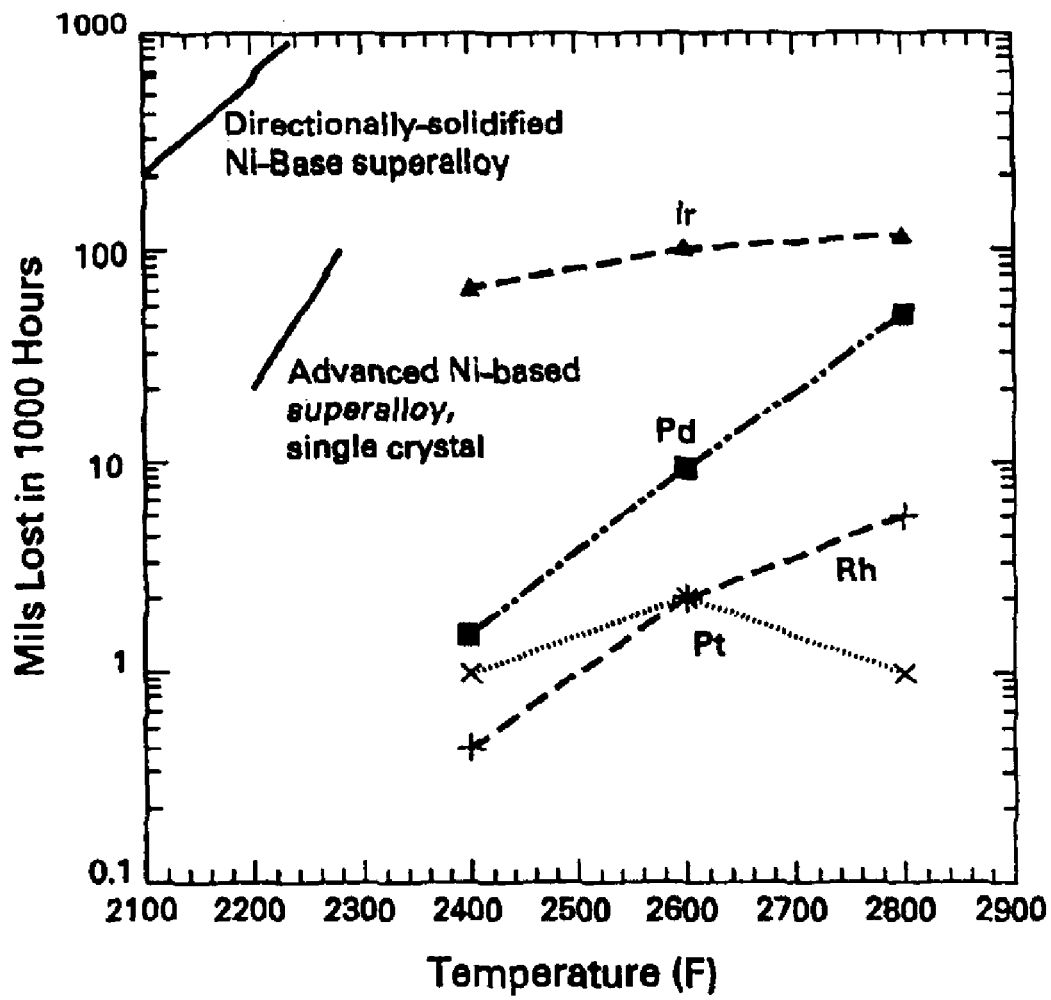
FIG. 8 is a graph of oxidation data.

FIG. 8 is a graph showing oxidation data for Pt, Rh, Pd, and iridium (Ir) as well as for two conventional turbine blade materials, a directionally solidified Ni-base superalloy and a single crystal Ni-base superalloy of a different composition than the former alloy. The test performed to generate this data used metal specimens that were identical in size and each was exposed for the same amount of time (1000 hours), and so the change in specimen diameter is plotted as a direct measure of oxidation effects in order to compare material performance. Although each of the platinum group metals showed lower losses of metal than would be expected for the two superalloys for temperatures above about 1300° C., Ir was the worst of the platinum group metals tested and its oxidation rate was deemed to be too high for use as a major (>30 atomic percent) component of the second material described for the present invention. Ruthenium (Ru) shows similar performance to Ir under these conditions. However, these elements are useful as minor alloying additions, and in certain embodiments of the invention, the second material comprises a metal selected from the group consisting of Ir, Ru, and mixtures thereof, at a level of up to about 5 atomic percent.

The second material, as employed in some embodiments of the present invention, further comprises chromium (Cr), which provides additional oxidation resistance to the material. In particular embodiments, the Cr is present at a level of up to about 25 atomic percent. Certain embodiments further comprise aluminum (Al), and in particular embodiments the Al is present at a level of up to about 18 atomic percent. In certain embodiments, the second material further comprises nickel (Ni), which in certain embodiments is present at a level of up to about 45 atomic percent.

Still other embodiments employ a second material comprising a refractory superalloy, and in particular embodiments, the refractory superalloy comprises rhodium (Rh). In particular embodiments of the present invention, the second material comprises Rh at a level of at least about 65 atomic percent. Alloys comprising iridium at such levels have been shown to exhibit poor oxidation resistance in the environments under consideration for the present invention, and thus in particular embodiments of the invention, the refractory superalloy comprises Ir at a level of at most about 5 atomic percent. To attain the required mechanical properties, the refractory superalloys further comprise a quantity of additional material, where the quantity of additional material comprises at least one supplementary element selected from the group consisting of titanium (Ti), vanadium (V), zirconium (Zr), niobium (Nb), molybdenum (Mo), hafnium (Hf), tantalum (Ta), tungsten (W), and mixtures thereof. These alloys do not resist oxidation to the levels shown by the Pt-group metals themselves, but their combination of oxidation resistance and mechanical properties is often suitable for use in embodiments of the present invention. In particular embodiments, the at least one supplemental element is present in the second material at a level of up to about 7 atomic percent. In certain embodiments, the quantity of additional material comprises a plurality of supplemental elements, each supplemental element selected from the same group as listed above for the at least one supplementary element. In certain of these embodiments comprising a plurality of supplemental elements, the quantity of additional material is present in the second material at a level at or below about 10 atomic percent.

In certain embodiments of the present invention, the creep life of the second material is greater than the creep life of the first material. In other embodiments, the fatigue life of the second material is greater than the fatigue life of said first material. In particular embodiments, the creep life of the second material is at least about three times greater than the creep life of the first material, and in certain embodiments the fatigue life of the second material is at least about three times greater than the fatigue life of the first material. With a material having higher creep life or higher fatigue life in place at the blade tip, a turbine blade is better able to withstand the severe environment existing locally at these locations than even a new conventional turbine blade.

The second material comprises a directionally solidified eutectic (DSE) in certain embodiments of the invention. Particular embodiments of this type employ a DSE comprising nickel (Ni), tantalum (Ta), and carbon (C), herein referred to as "NiTaC", and an exemplary NiTaC composition is shown in the Table. NiTaC alloys of this type form a fibrous microstructure with very strong and hard tantalum carbide fiber-shaped phase reinforcing a more ductile Ni-based metallic matrix phase. The table also displays an alternate DSE composition, referred to herein as NiNbC, where niobium (Nb) is used as the carbide forming element in place of Ta. DSE Alloys of the types exemplified by the compositions displayed in the Table exhibit creep rupture lives exceeding those of commonly used single-crystal superalloys by a factor in the range from about 2 to about 10, where the test load is about 21 MPa at a temperature of about 1150° C. Fatigue lives for these exemplary alloys exceed those of commonly used single crystal alloys by a factor in the range of from about 1.5 to about 5 at a temperature of about 1150° C., where the strain range is about 0.1% and the frequency is about 20 cycles per minute.

[t1]

| Alloy (w/o) | Ni | Cr | Co | Al | W | Mo | Re | Ta | Nb | C | B | Zr | Ti | Fe | Y2O3 |
| --- | --- | --- | --- | --- | --- | --- | --- | --- | --- | --- | --- | --- | --- | --- | --- |
| NiTaC | Bal | 4.2 | 3.9 | 5.5 | 4.5 | 3.2 | 6.8 | 9.0 | 0 | 27 | .01 | 0 | 0 | 0 | 0 |
| NiNbC | Bal | 4 | 10 | 6 | 10 | 0 | 0 | 0 | 3.8 | .5 | 0 | 0 | 0 | 0 | 0 |
| MA754 | Bal | 20 | 0 | .3 | 0 | 0 | 0 | 0 | 0 | .05 | 0 | 0 | .5 | 1 | .6 |
| MA6000 | Bal | 15 | 0 | 4.5 | 4 | 2 | 0 | 2 | 0 | .05 | .01 | .15 | 2.5 | 0 | 1.1 |

In some embodiments where the second material creep life is higher than that of the first material, the second material comprises an oxide dispersion strengthened (ODS) material. Two exemplary compositions are displayed in the Table. The alloy names MA754 and MA6000 are trademarks of Inco, Limited. In particular embodiments of this type, the ODS material comprises Ni, chromium (Cr), aluminum (Al), and yttium oxide. The uniform dispersion of sub-micron-sized yttrium oxide particles, typically present in a concentration range of from about 0.5 volume % to about 2.5 volume %, and their large-grained and elongated-grained microstructures, provide a remarkably stable and effective barrier to dislocation motion, accounting for the excellent creep life of these materials. ODS alloys of the types exemplified by the compositions displayed in the Table exhibit creep rupture lives exceeding those of commonly used single-crystal superalloys by a factor in the range from about 2 to about 10, where the test load is about 21 MPa at a temperature of about 1150° C. The chromium in the alloys, present from about 15 weight % to about 20 weight %, provides effective oxidation resistance to the Ni-based matrix.

The collection of alloys discussed above does not represent an exhaustive list of all possible materials that may be employed to form embodiments of the present invention. These materials are discussed in order to illustrate the concepts of the present invention and the manner in which their properties can be advantageously exploited to achieve improved turbine blade life. A significant benefit of embodiments of the present invention is that the advantages of the second material are applied without sacrificing the overall design requirements of the blade, because the second material is disposed only at the blade tip, while the remainder of the turbine blade comprises first material, selected in accordance with the pertinent design requirements for the particular turbine blade. Potentially disadvantageous properties of certain second materials, such as high cost or density, have a reduced effect on the overall blade because the second material comprises only a fraction of the overall surface area of the blade. The properties of the blade are thus "tailored" to the expected localized environments, reducing the need for compromise during the design process for new blades, and increasing the expected lifetime for repaired articles operating in current systems.

Another embodiment of the invention provides a method for manufacturing a gas turbine blade 10, the method comprising providing a gas turbine blade body 12, providing at least one freestanding tip insert 20 (FIG. 2), and disposing the at least one tip insert 20 onto the gas turbine blade body 12 such that a blade tip 11 of the turbine blade 10 comprises the at least one tip insert 20. As in previously described embodiments, manufacturing method embodiments are provided in which the blade body 12 comprises a first material and the at least one tip insert 20 comprises a second material, and the first and second materials have the same characteristics as the first and second materials in the previously discussed embodiments. The alternatives for the composition of the second material discussed previously for the repair method embodiments are also applied in certain of the manufacturing method embodiments. Furthermore, the alternative embodiments relating to aspects of the disposing step, set forth above for the repair method embodiments, are also pertinent to the manufacturing method embodiments of the present invention. In certain embodiments, heat treatment and machining steps are included in the manufacturing process, for the same reasons as described above for repair method embodiments, as is the step of applying a coating to the turbine blade to afford further high-temperature protection. Particular embodiments provide that the at least one tip insert 20 further comprises at least one internal channel 32 (FIG. 2) to allow for internal air cooling of the blade tip during service, and as described above for the repair method embodiments, certain embodiments of the invention include a plurality of cooling holes 24 (FIG. 2) in the at least one tip insert 20.

Embodiments of the present invention also provide a freestanding tip insert 60 (FIG. 6) for manufacture and repair of a tip 11 of a gas turbine blade 10 (FIG. 1), the tip insert 60 comprising an external surface 66 (FIG. 6) that substantially conforms with specified nominal dimensions for an external surface 34 (FIG. 3) of the blade 10. An "external surface" as used herein in reference to the tip insert 60 refers to any surface of the tip insert 60 that, when the tip insert is disposed on the turbine blade 10 in accordance with embodiments of the present invention, is in contact with the hot gas stream during operation of the gas turbine. An "external surface" as used herein in reference to a blade 10 refers to any surface that is in contact with the hot gas stream during operation of the gas turbine. The term "substantially conforms" as used herein means that upon disposition of the tip insert 60 onto the blade 10, the resulting external surface 34 is within specified tolerance limits for the blade at the blade tip, either as-disposed or with routine machining to blend the surfaces.

In certain embodiments, the tip insert 20 comprises a material having a creep life of at least about 1000 hours tested at about 1150° C. and about 21 MPa, a fatigue life of at least about 33,000 cycles to failure tested at about 20 cycles per minute and a strain range of about 0.1% at about 1150° C., and an oxidation resistance of at least about 6 h-cm2/mg at about 1150° C. In specific embodiments, the tip insert material has an oxidation resistance of at least about 20 h-cm2/mg at about 1150° C., in others the tip insert material has a creep life of at least about 3000 hours tested at about 1150° C. and about 21 MPa, and in others the tip insert material has a fatigue life of at least about 100,000 cycles to failure tested at about 20 cycles per minute and a strain range of about 0.1% at about 1150° C. Suitable alternatives for the composition of the tip insert material, discussed previously for the "second" material in the repair method and manufacturing method embodiments, are also applied in certain tip insert embodiments. Certain tip insert embodiments provide that the tip insert 20 further comprises at least one cooling channel 32, and other embodiments provide that the tip insert 20 further comprises a plurality of cooling holes 24 as described for the above embodiments.

According to the embodiments of this invention, any of a variety of metal fabrication and processing methods is suitable to fabricate the tip insert. Examples of suitable processes include, but are not limited to, casting (including directional solidification and single crystal processing methods); forging; extruding; in-situ processing of braze tape; or forming on a sacrificial mandrel by deposition processes such as electron beam physical vapor deposition, laser powder consolidation, chemical vapor deposition, ion plasma deposition, thermal spraying, and electroplating.

A gas turbine blade 10 embodiment of the present invention comprises a turbine blade body 12 and a blade tip 11, wherein the blade tip 11 comprises at least one tip insert 20 joined to the blade body 12. As above, embodiments are provided in which the blade body 12 comprises a first material, and the at least one tip insert 20 comprises a second material, respectively, and these materials have the characteristics described for the first material and the second material, respectively, in previously discussed embodiments. The alternatives for the composition of the tip insert 20 material, discussed previously for the repair method, manufacturing method, and tip insert embodiments, are also applied in certain turbine blade embodiments. Embodiments relating to the existence of at least one cooling channel 32 in the insert 20 and a plurality of cooling holes 24, and coating 23, as described for the above embodiments, are also provided for certain turbine blade embodiments.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method for repair of a gas turbine blade, comprising:
providing a gas turbine blade, said blade comprising a first material and further comprising a blade tip and a blade body;
removing at least one portion of said blade tip;
providing at least one freestanding tip insert comprising a second material; and
disposing said at least one tip insert onto said gas turbine blade body such that said at least one tip insert replaces said at least one removed portion of said blade tip;
wherein said second material has at least one attribute selected from the group consisting of
 a. a melting temperature greater than a melting temperature of said first material by at least about 80° C.;
 b. a fatigue life at least about three times greater than a fatigue life of said first material; and
 c. a creep life at least about three times greater than that of said first material.

2. The method of claim 1, wherein said blade tip comprises at least one squealer, and said at least one portion of said blade tip comprises said at least one squealer.

3. The method of claim 1, wherein disposing comprises joining said at least one tip insert to said blade by means of a process selected from the group consisting of welding, brazing, and diffusion bonding.

4. The method of claim 1, wherein said at least one tip insert comprises at least one internal cooling channel.

5. The method of claim 1, wherein said at least one tip insert comprises a plurality of cooling holes.

6. The method of claim 1, wherein said at least one tip insert comprises a superalloy based on a metal selected from the group consisting of iron, cobalt, and nickel.

7. The method of claim 6, wherein said at least one tip insert comprises a directionally solidified material.

8. The method of claim 6, wherein said at least one tip insert comprises a single crystal material.

9. The method of claim 1, wherein said blade comprises a first material and said at least one tip insert comprises a second material, and wherein each of a creep life, a fatigue life, and an oxidation resistance for said first material is essentially equivalent to each of a creep life, a fatigue life, and an oxidation resistance of said second material, respectively.

10. The method of claim 1, wherein said second material comprises a platinum group metal modified nickel-based superalloy.

11. The method of claim 10, wherein said superalloy comprises a metal selected from the group consisting of Pt, Pd, Rh, Ir, and Ru.

12. The method of claim 1, wherein said second material has an oxidation resistance at least about 3 times greater than an oxidation resistance of said first material.

13. The method of claim 12, wherein said second material comprises a material selected from the group consisting of Rh, Pt, Pd, and mixtures thereof.

14. The method of claim 13, wherein said at least one tip insert further comprises a substrate material, and wherein said second material is disposed on said substrate material.

15. The method of claim 14, wherein said second material comprises a layer with a cross-sectional thickness in the range from about 0.13 mm to about 0.64 mm.

16. The method of claim 13, wherein said second material comprises Rh at a level of at least about 65 atomic percent.

17. The method of claim 13, wherein said second material further comprises a metal selected from the group consisting of Ir, Ru, and mixtures thereof, at a level of up to about 5 atomic percent.

18. The method of claim 13, wherein said second material further comprises Cr.

19. The method of claim 18, wherein the Cr is present at a level of up to about 25 atomic percent.

20. The method of claim 18, wherein said second material further comprises Al.

21. The method of claim 20, wherein said directionally solidified eutectic material comprises Ni, Ta, and C.

22. The method of claim 20, wherein the Al is present at a level of up to about 18 atomic percent.

23. The method of claim 20, wherein said second material further comprises Ni.

24. The method of claim 23, wherein the Ni is present at a level of up to about 45 atomic percent.

25. The method of claim 12, wherein said second material comprises a refractory superalloy.

26. The method of claim 25, wherein said refractory superalloy comprises Rh.

27. The method of claim 1, wherein said second material comprises a directionally solidified eutectic material.

28. The method of claim 1, wherein said second material comprises an oxide dispersion strengthened material.

29. The method of claim 28, wherein said oxide dispersion strengthened material comprises Ni, Cr, and yttrium oxide.

30. A gas turbine blade repaired by the method of claim 1.

31. A method for repair of a gas turbine blade, comprising:
providing a gas turbine blade, said blade comprising a first material and further comprising a blade tip and a blade body;
removing at least one portion of said blade tip;
providing at least one freestanding tip insert, said at least one tip insert comprising a second material chosen from at least one of a single crystal nickel-based superalloy, a NiTaC directionally solidified eutectic alloy, and an oxide dispersion strengthened alloy;
wherein said second material has at least one attribute selected from the group consisting of
 a. fatigue life at least about three times greater than a fatigue life of said first material, and
 b. a creep life at least about three times greater than that of said first material;
and
disposing said at least one tip insert onto said gas turbine blade body such that said tip insert replaces said at least one removed portion of said blade.

32. A method for repair of a gas turbine blade, comprising:
providing a gas turbine blade, said blade comprising a first material and further comprising a blade tip said a blade body;
removing at least one portion of said blade tip;
providing at least one freestanding tip insert, said at least one tip insert comprising a second material selected from the group consisting of rhodium, platinum, palladium, and mixtures thereof, wherein said second material has a melting temperature greater than a melting temperature of said first material by at least about 80° C.; and
disposing said at least one tip insert onto said gas turbine blade body such that said tip insert replaces said at least one removed portion of said blade.

33. A gas turbine blade comprising:

a turbine blade body comprising a first material; and a blade tip;

wherein said blade tip comprises at least one tip insert comprising a second material joined to said blade body, and wherein said second material has at least one attribute selected from the group consisting of
- a. a melting temperature greater than a melting temperature of said first material by at least about 80° C.;
- b. a fatigue life at least about times than a fatigue life of said first material; and
- c. a creep life at least about three times greater than that of said first material.

34. The gas turbine blade of claim 33, wherein a cross sectional thickness of said at least one tip insert is less than a wall thickness of said turbine blade body.

35. The gas turbine blade of claim 33, wherein a cross sectional thickness of said at least one tip insert is at least equal to a wall thickness of said turbine blade body.

36. The gas turbine blade of claim 33, wherein said at least one blade tip comprises at least one squealer.

37. The gas turbine blade of claim 33, wherein said at least one tip insert is joined to said blade body by means of a process selected from the group consisting of welding, brazing, and diffusion bonding.

38. The gas turbine blade of claim 33, wherein said at least one tip insert comprises at least one internal cooling channel.

39. The gas turbine blade of claim 33, wherein said at least one tip insert comprises a plurality of cooling holes.

40. The gas turbine blade of claim 33, wherein said at least one tip insert comprises a superalloy based on a metal selected from the group consisting of iron, cobalt, and nickel.

41. The gas turbine blade of claim 40, wherein said at least one tip insert comprises a directionally solidified material.

42. The gas turbine blade of claim 40, wherein said at least one tip insert comprises a single crystal material.

43. The gas turbine blade of claim 33, wherein said second material comprises a platinum group metal modified nickel-based superalloy.

44. The gas turbine blade of claim 43, wherein said superalloy comprises a metal selected from the group consisting of Pt, Pd, Rh, Ir, and Ru.

45. The gas turbine blade of claim 33, wherein said second material has an oxidation resistance at least about three times greater than an oxidation resistance of said first material.

46. The gas turbine blade of claim 45, wherein said second material comprises a refractory superalloy.

47. The gas turbine blade of claim 46, wherein said refractory superalloy comprises Rh.

48. The gas turbine blade of claim 33, wherein said at least one tip insert further comprises a substrate material, and wherein said second material is disposed on said substrate material.

49. The method of claim 48, wherein said second material comprises a layer with a cross sectional thickness in the range from about 0.13 mm to about 0.64 mm.

50. The gas turbine blade of claim 33, wherein said second material comprises Rh at a level of at least about 65 atomic percent.

51. The gas turbine blade of claim 33, wherein said second material further comprises a metal selected from the group consisting of Ir, Ru, and mixtures thereof, at a level of up to about 5 atomic percent.

52. The gas turbine blade of claim 33, wherein said second material further comprises Cr.

53. The gas turbine blade of claim 52, wherein the Cr is present at a level of up to about 25 atomic percent.

54. The gas turbine blade of claim 52, wherein said second material further comprises Al.

55. The gas turbine blade of claim 54, wherein the Al is present at a level of up to about 18 atomic percent.

56. The gas turbine blade of claim 54, wherein said second material further comprises Ni.

57. The gas turbine blade of claim 56, wherein the Ni is present at a level of up to about 45 atomic percent.

58. The gas turbine blade of claim 33, wherein said directionally solidified eutectic material comprises Ni, Ta, and C.

59. The gas turbine blade of claim 33, wherein said oxide dispersion strengthened material comprises Ni, Cr, and yttrium oxide.

60. A gas turbine blade comprising:

a turbine blade body comprising a first material; and a blade tip;

wherein said blade tip comprises at least one tip insert joined to said blade body, said at least one tip insert comprising a second material chosen from at least one of a single crystal nickel-based superalloy, a NiTaC directionally solidified eutectic alloy, and an oxide dispersion strengthened alloy, wherein said second material has at least one attribute selected from the group consisting of
- a. a fatigue life at least about three times greater than a fatigue life of said first material, and
- b. a creep life at least about three times greater than that of said first material.

61. A gas turbine blade comprising:

a turbine blade body comprising a first material; and a blade tip;

wherein said blade tip comprises at least one tip insert joined to said blade body, said at least one tip insert comprising a second material selected from the group consisting of rhodium, platinum, palladium, and mixtures thereof, wherein said second material has a melting temperature greater than a melting temperature of said first material by at least about 80° C.

* * * * *